United States Patent [19]

Arbuckle

[11] 4,328,105

[45] May 4, 1982

[54] TREATMENT OF SUSPENDED SOLIDS—AND ADSORBABLE CONTAMINANT—CONTAINING LIQUID

[75] Inventor: William B. Arbuckle, Gainesville, Fla.

[73] Assignee: Linde Aktiengesellschaft, Wiesbaden, Fed. Rep. of Germany

[21] Appl. No.: 119,136

[22] Filed: Feb. 6, 1980

[51] Int. Cl.³ .............................................. B01D 37/02
[52] U.S. Cl. .................................. 210/663; 210/670; 210/777; 210/796; 210/807
[58] Field of Search .................... 210/33, 34, 36, 40, 210/75, 77–82, 189, 274, 276, 280, 502, 503, 32, 35, 675, 677, 679, 694, 777, 778, 792–796, 663, 670, 807

[56] References Cited

U.S. PATENT DOCUMENTS

| | | | |
|---|---|---|---|
| 3,252,899 | 5/1966 | Rice et al. | 210/75 |
| 3,327,859 | 6/1967 | Pall | 210/503 |
| 3,420,709 | 1/1969 | Barrett et al. | 210/503 |
| 3,436,343 | 4/1969 | Smith | 210/33 |
| 3,698,554 | 10/1972 | Mail | 210/274 |
| 4,061,807 | 12/1977 | Shaler et al. | 428/36 |
| 4,137,162 | 1/1979 | Mohri et al. | 210/40 |
| 4,162,216 | 7/1979 | Nyer | 210/80 |

OTHER PUBLICATIONS

Lee, D. W. et al., "Selective Separation of Nickel II by Dimethylglyoxime-Treated Polyurethane Foam", *Analytical Chemistry*, vol. 48, No. 14, Dec. 1976, pp. 2214-2218.

*Primary Examiner*—Ivars C. Cintins
*Attorney, Agent, or Firm*—Millen & White

[57] ABSTRACT

A process for removal of suspended solids and adsorbable contaminants from an influent liquid containing same. A filter bed of porous polyurethane particles is provided, and a particulate adsorbent selective for the adsorbable contaminants is placed into the pores of the polyurethane particles. The suspended solids—and adsorbable contaminants—containing influent liquid is passed through the filter bed for deposition of the suspended solids on the polyurethane particles and adsorption of the adsorbable contaminants by the particulate adsorbent to yield a solids—and adsorbable contaminants—depleted liquid effluent, which is discharged from the filter bed. The influent liquid is passed through the filter bed until the filter bed is at least partially loaded with deposited solids and adsorbed contaminants, whereupon same are removed from the filter bed polyurethane particles to regenerate same, prior to repetition of the cycle. The specific improvement of the invention relates to methods for placing the particulate adsorbent into the pores of the polyurethane particles.

24 Claims, 2 Drawing Figures

TREATMENT OF SUSPENDED SOLIDS—AND ADSORBABLE CONTAMINANT—CONTAINING LIQUID

BACKGROUND OF THE INVENTION

1. Field of the Invention

This invention relates to a process for removal of suspended solids and adsorbable contaminants from an influent liquid containing same.

2. Description of the Prior Art

In the field of liquid and wastewater treatment, filtration has long been a major method of removing suspended solids from liquid streams. In wastewater treatment applications in particular, the presence of suspended solids materials is frequently a major process problem and filtration has commonly been employed as a means of reducing and/or removing suspended solids from streams such as municipal sewage and wastewater intended for recycle use. In such applications, downflow and upflow sand filters and dual or mixed media filters have been widely employed and have in general been shown to be cost effective and efficient in use. Nonetheless, work by practitioners in the field has shown that sand and mixed media filters are in general effective in removing suspended solids, but only under limited solids loading conditions. In general, solids concentrations of the liquid stream entering the filter must be below about 100-200 milligrams/liter. At suspended solids concentration values above this level, the filtration bed is susceptible to clogging and high pressure drop across the bed.

In recent years, the operation of filtration has been somewhat improved in the foregoing applications by the use of polyurethane as a filtration medium. In general practice, polyurethane foam is cut up into small pieces and placed into a retaining vessel to form the filtration bed. Wastewater or other liquid containing suspended solids is then flowed through the bed with resulting deposition of suspended solids on the polyurethane particles. The suspended solids thus remain on the polyurethane particles and the liquid from which the suspended solids has been deposited subsequently passes through the bed and is discharged as liquid depleted in suspended solids.

In general, the use of polyurethane foam as a filtration medium provides numerous operating advantages over beds employing sand or conventional mixed media filtration materials, including higher solids capacity, lower pressure drop head losses, higher resistance to clogging and removal of numerous soluble organic contaminants from the liquid stream.

For removal of adsorbable contaminants, such as toxic organic chemical species, from liquid, it has been common practice in the liquid treatment field to employ adsorbent beds through which the liquid containing adsorbable contaminants is passed for removal of such contaminants. In particular, activated carbon has been widely employed as an adsorbent medium due its high selectivity for many organic and inorganic contaminants of liquid streams. In the field of wastewater treatment, such adsorbers are generally quite large in size, involving 30-60 minute adsorbent bed liquid retention times. The liquid undergoing treatment requires prior filtration in order to avoid clogging of the adsorbent bed, and the adsorbent usage rate has to be substantial before on-site regeneration renders the adsorbent costs economical; e.g., activated carbon usage must generally be greater than about 600 pounds per day before on-site regeneration renders the activated carbon adsorbent costs reasonable on a per-pound basis.

To overcome the requirement of prior filtration upstream of the adsorbent bed, the prior art has proposed to operate the adsorbent bed in an expanded or fluidized bed operating mode. Such mode of operation has utility primarily for treatment of liquids with low solids levels, e.g., less than 100 milligrams suspended solids per liter, while higher solids content liquid streams are likely to still require filtration, and even in low solids content liquid treatment operation where expanded or fluidized bed operation is possible, the liquid effluent from the adsorbent bed will still contain substantial levels of suspended solids.

The prior art has further proposed to employ powdered adsorbents for removal of adsorbable contaminants from liquid in wastewater treatment by the activated sludge process, by adding the powdered adsorbent, such as activated carbon, directly to the wastewater treatment aeration tank. In such modifications, the powdered activated carbon or other adsorbent is mixed with the biological activated sludge solids and, as a result, both the adsorbent and the biological solids have to be dewatered and regenerated together, which is disadvantageous from the standpoint of operating system complexity and treatment cost. Furthermore, such modification results in only slight polishing, i.e., removal of adsorbable contaminants, from the treated liquid.

Accordingly, it is an object of the invention to provide an improved, integrated process for treatment of suspended solids—and adsorbable contaminant—containing liquid, by filtration with porous polyurethane particles and sorbable contaminant removal with particulate adsorbent.

Other objects and advantages of the invention will be apparent from the ensuing disclosure and appended claims.

SUMMARY OF THE INVENTION

This invention relates to a process for removal of suspended solids and adsorbable contaminants from an influent liquid containing same.

The process comprises the steps of:

(a) providing a filter bed of porous polyurethane particles;

(b) placing a particulate adsorbent selective for said adsorbable contaminants into the pores of the polyurethane particles;

(c) passing the suspended solids—and adsorbable contaminants—containing influent liquid through the filter bed for deposition of the suspended solids on the polyurethane particles and adsorption of the adsorbable contaminants by the particulate adsorbent to form a solids—and adsorbable contaminants—depleted liquid effluent, and discharging the liquid effluent from the filter bed;

(d) continuing step (c) until the filter bed is at least partially loaded with deposited solids and adsorbed contaminants;

(e) removing deposited solids and absorbate loaded adsorbent from the filter bed polyurethane particles to regenerate same; and (f) repeating steps (b) to (e) in sequence.

In accordance with the invention, step (b) is carried out by one of the following methods:

(1) flowing a liquid containing the particulate adsorbent through the filter bed at a volumetric flow rate at least equal to the highest volumetric flow rate at which influent liquid is passed through the filter bed in step (c), whereby particulate adsorbent passes from the liquid into the pores of the polyurethane particles and firmly lodges therein;

(2) flowing a liquid containing the particulate adsorbent through the filter bed at a volumetric flow rate less than the highest volumetric flow rate at which influent liquid is passed through the filter bed in step (c), to cause particulate adsorbent to pass from the liquid into the pores of the polyurethane particles, followed by flowing a liquid to the filter bed at a volumetric flow rate at least equal to the highest volumetric flow rate at which influent liquid is passed through the filter bed in step (c), to firmly lodge particulate adsorbent in the pores of the polyurethane particles; or (3) mixing a liquid containing the particulate adsorbent in the filter bed to cause particulate adsorbent to pass from the liquid into the pores of the polyurethane particles, at least partially draining the liquid from the filter bed such that not more than one bed volume of the liquid remains associated with the polyurethane particles, and flowing a fluid through the filter bed at a volumetric flow rate at least equal to the highest volumetric flow rate at which influent liquid is passed through the filter bed in step (c), to firmly lodge particulate adsorbent in the pores of the polyurethane particles, whereby the particulate adsorbent is firmly lodged in the pores of the polyurethane particles throughout step step (c) and is not fluidized in the filter bed during such step.

As used herein, the word "pores" includes both pores within the individual polyurethane particles and pores between adjacent polyurethane particles in the filter bed. The term "bed volume" means a unit volume of liquid which is equal to the volume of the filter bed polyurethane particles, e.g., if the polyurethane particles are disposed in a filter bed having a cross-sectional area of 1 ft$^2$ and a height of 1 ft., one bed volume of liquid would be 1 ft$^3$ of liquid.

DESCRIPTION OF THE PREFERRED EMBODIMENTS

Figure 1:
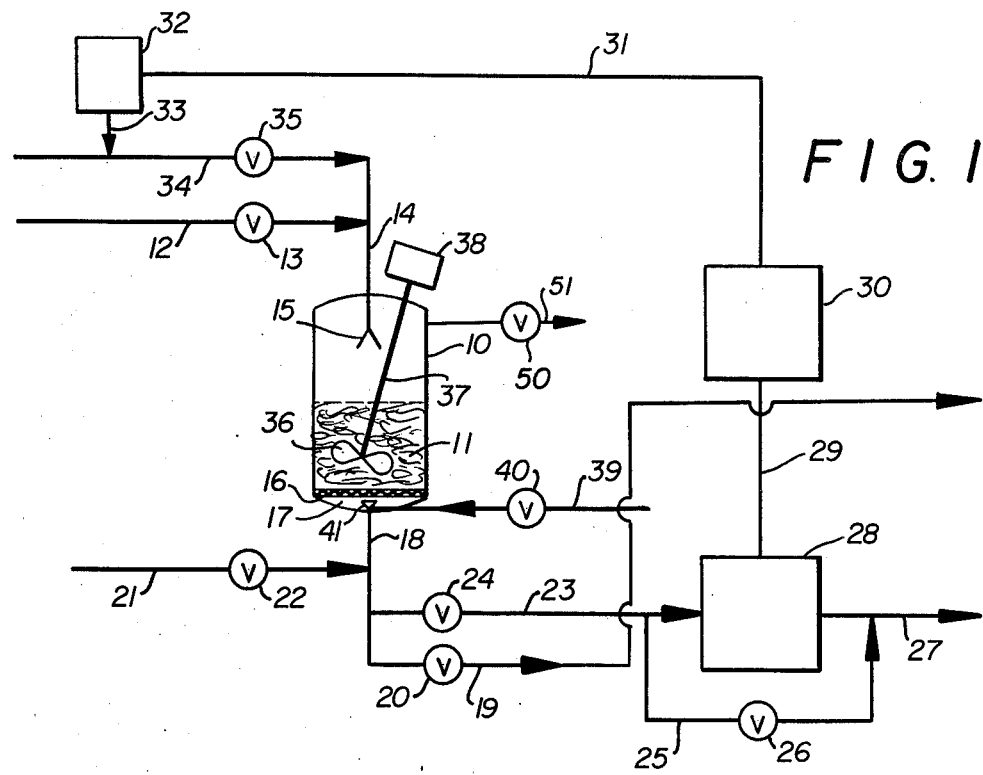
FIG. 1 is a schematic diagram of a liquid treatment system wherein the process of the present invention may be carried out.

Referring now to FIG. 1, a filter bed 11 of porous polyurethane particles is disposed in a vertically extending filter vessel 10 of constant horizontal cross-section, so that influent liquid may be passed through the filter bed from top to bottom thereof to form a solids- and adsorbable contaminants-depleted liquid effluent. The polyurethane particles in bed 11 may suitably be of discontinuous, reticulated ester or ether linked polyurethane foam having 10 to 100 cells per linear inch, and more preferably 20 to 60 cells per linear inch. For open-celled reticulated or non-reticulated polyurethane foams suitable for forming the filter bed polyurethane particles, the foam should have an air porosity value of 80–240, and preferably 100–170, standard cubic feet of air per minute per square foot. As used herein, the air porosity value of the polyurethane foam is based on the flow rate of air, at 23° C. and 50% relative humidity, which, when flowed through a polyurethane foam sheet of 0.5 inch thickness and a 5 inch×5 inch cross-section (positioned normal to the direction of air flow) at an inlet air pressure of 14.7 psig, produces a differential pressure of 0.100 inch of water between the air stream pressure values upstream and downstream of the polyurethane foam sheet. The numerical air porosity value is then calculated as the value of the above-determined air flow rate, in cubic feet per minute, divided by the cross-sectional area of the polyurethane foam test section, in ft$^2$.

The filter bed 11 of porous polyurethane particles is disposed in filter vessel 10 on a screen or support grid 16 extending across the lower portion of the vessel, thereby forming a lower plenum space 17 below support member 16.

Next, a particulate adsorbent selected for the adsorbable contaminants in the liquid to the treated is placed into the pores of the polyurethane particles in bed 11. In accordance with the invention, this may be carried out in one of three alternative ways, as described below.

In the first method, system valves 35 and 20 are opened, while all other system valves remain closed. Particulate adsorbent from source 32 is thereupon conducted via conduit 33 to feed line 34, through which flows a liquid free of suspended solids and adsorbable contaminants. The introduction of particulate adsorbent from conduit 33 results in formation of a liquid containing particulate adsorbent in line 34, which is thereafter conducted to inlet manifold conduit 14 for discharge into the filtration vessel 10 by liquid nozzle or spray distributor 15. The liquid containing particulate adsorbent is thereby flowed through the filter bed of polyurethane particles at a flow rate at least equal to the highest volumetric flow rate which influent liquid is passed through the filter bed during normal on-stream operation, whereby particulate adsorbent passes from the liquid into the pores of the polyurethane particles in bed 11 and firmly lodge in the pores of the polyurethane particles. The liquid then depleted of particulate adsorbent passes downwardly through the bed and support member 16 into the plenum space of the vessel, from which it is discharged in effluent manifold conduit 18 for discharge from the process system in line 19.

Alternatively, particulate adsorbent may be conducted from source 32 via conduit 33 into the feed liquid 34 and passed through the filter bed 11 at a volumetric flow rate less than the highest volumetric flow rate at which influent liquid is passed through the filter bed in normal on-stream operation, to cause particulate adsorbent to pass from the liquid into the pores of the polyurethane particles, with discharge of particulate adsorbent-depleted liquid from the system via conduits 18 and 19. Following loading of the polyurethane particles with particulate adsorbent in this manner, passage of particulate adsorbent from line 33 into conduit 34 is terminated, and the liquid in line 34, free of any particulate adsorbent content, is thereupon flowed through the filter bed by conduits 14, 18 and 19, at a volumetric flow rate at least equal to the highest volumetric flow rate at which influent liquid is passed through the filter bed during normal on-stream operation, to firmly lodge particulate adsorbent in the pores of the polyurethane particles and remove excess particulate adsorbent from the filter bed.

In a third alternative method for placing particulate adsorbent into the pores of the polyurethane particles in bed 11, particulate adsorbent from source 32 is conducted via conduit 33 into feed line 34 and the resultant particulate adsorbent solids-liquid mixture is conducted via influent manifold conduit 14 into the filtration vessel 10. Valve 20 in conduit 19 is closed at this point, so that the liquid containing particulate adsorbent is conducted into the adsorbent vessel to at least partially fill same. After the requisite volume of particulate adsorbent-mixture has been introduced into the filtration vessel, valve 35 in feed line 34 is closed and the mechanical agitator, comprising impeller 36 mounted on shaft 37 joined to motor drive means 38, is activated to mix the liquid containing the particulate adsorbent in the filter bed to cause particulate adsorbent to pass from the liquid into the pores of the polyurethane particles. After thorough mixing, the agitator is deenergized and liquid is at least partially drained from the filter bed such that not more than one bed volume of the liquid remains associated with the polyurethane particles by opening of valve 20 in discharge conduit 19, so that liquid depleted particulate adsorbent is passed out of filtration vessel 10. As an alternative to the use of mechanical mixing of the liquid containing the particulate adsorbent in the filter bed to load the filter bed polyurethane particles with adsorbent, the mixing may be effected by sparging gas into the liquid (sparging means not shown) or by combining mechanical mixing and gas sparging of the liquid. Subsequently, feed liquid in line 34, without introduction of particulate adsorbent thereto via conduit 33, is passed through inlet manifold conduit 14 into the filtration vessel 10 and through the filtration bed 11, then out of the process system via conduits 18 and 19 (valve 20 being opened), at a volumetric flow rate at least equal to the highest volumetric flow rate at which influent liquid is passed through the filter bed during normal on-stream operation, to firmly lodge particulate adsorbent in the pores of the polyurethane particles and remove excess particulate adsorbent from the filter bed.

Each of the above-described methods of placing a particulate adsorbent into the pores of the polyurethane particles, results in the particulate adsorbent being firmly lodged in the pores of the polyurethane particles throughout the normal on-stream filtration operation, so that the particulate adsorbent is not fluidized in the filter bed during such step.

After the particulate adsorbent has been placed into the pores of the polyurethane particles in filter bed 11, valves 13 and 20 are open, while all other system valves are closed. Influent liquid containing suspended solids and adsorbable contaminants is then introduced into the process system in line 12, passing through influent manifold conduit 14 to liquid distributor 15 for introduction to the filter bed 11 in filtration vessel 10. The suspended solids- and adsorbable contaminants-containing influent liquid flows downwardly through the filter bed 11 for deposition of the suspended solids on the polyurethane particles and adsorption of the adsorbable contaminants by the particulate adsorbent in the pores of the polyurethane particles, to yield a solids- and adsorbable contaminants-depleted liquid effluent which collects in the lower plenum space 17 of the filtration vessel 10 and is discharged therefrom in effluent manifold conduit 18 and discharge conduit 19. Such passage of suspended solids- and adsorbable contaminants-containing influent liquid through the filter bed is continued until the filter bed is at least partially loaded with deposited solids and adsorbed contaminants, whereupon deposited solids and adsorbate loaded adsorbent is removed from the filter bed polyurethane particles to regenerate same, prior to again placing a particulate adsorbent selective for the adsorbable contaminants into the pores of the polyurethane particles and re-initiating normal on-stream filtration and adsorption operation.

At the beginning of the regeneration sequence, all system valves are closed. In one mode of regeneration, valve 22 in line 21 is opened and "clean", i.e., suspended solids and sorbable contaminants-free, regeneration liquid is introduced into the system and flowed through conduits 21 and 18 into the filtration vessel 10 containing the filter bed of polyurethane particles. Valve 22 is thereupon closed and the mechanical agitator comprising impeller 36 is energized to mechanically mix the regeneration liquid containing the polyurethane particles for sufficient time to cause deposited solids and adsorbate-loaded adsorbent to disengage from the polyurethane particles and pass into the regeneration liquid. Subsequently, the disengaged solids- and adsorbent-containing regeneration liquid is drained from the polyurethane particles and filtration vessel 10 in conduit 18. The disengaged solids- and adsorbent-containing regeneration liquid is thereafter passed into conduit 23, by opening of valve 24 therein, and is flowed to the treatment complex 28, wherein the adsorbent is separated from the disengaged solids-containing regeneration liquid, with the former being discharged into line 29 and the latter into line 27 for discharge from the system. The separation in complex 28 may be effected by centrifuge or other means commonly known to those in the solids-liquid separation art. The regeneration liquid employed in this mode of regeneration alternatively may be influent liquid, introduced to the filtration vessel 10 in line 12, thereby obviating the need for line 21 and valve 22.

The adsorbate-loaded adsorbent in line 29 is flowed to regeneration complex 30, wherein the adsorbate species are removed from the adsorbent to regenerate same, and the regenerated adsorbent is thereafter passed in line 31 to the adsorbent source means 32. In this manner, the adsorbate loaded adsorbent removed from the filter bed polyurethane particles is regenerated to remove adsorbate therefrom prior to re-use of the adsorbent in the subsequent step of placing particulate adsorbent into the pores of the polyurethane particles, as previously described. A variety of adsorbent regeneration techniques, such as thermal regeneration, caustic washing, solvent extraction and the like, may be conducted in the adsorbent regeneration complex 30, the particular method of adsorbent regeneration being a matter of choice in the given application and forming no part of the present invention.

Alternatively, the disengaged solids- and adsorbent-containing regeneration liquid in conduit 23 may be bypassed around the separation complex 28 by means of bypass conduit 25 having control valve 26 therein for a passage to discharge conduit 27, for those applications in which the adsorbate-loaded adsorbent may be disposed of without penalty and replaced with fresh adsorbent for the subsequent step of placing particulate adsorbent selective for the adsorbable contaminants of the influent wastewater into the pores of the polyurethane particles.

The carrying out of the above-described regeneration steps may result in adequate removal of deposited solids and adsorbate loaded adsorbent from the filter bed polyurethane particles, however, in some applications, it may be desirable to repeat such regeneration steps in sequence as successive regeneration cycles, with for example two to four successive regeneration cycles being carried out.

In the broad practice of the present invention, the regeneration liquid may be constituted in part by the fractional bed volume of hold-up liquid in the filter bed subsequent to termination of liquid flow through the filter bed, i.e., the interstitial liquid between particles of polyurethane, and liquid which is retained in the pores within the individual polyurethane particles in the filter bed subsequent to termination of liquid flow through the filter bed.

The following describes an alternative method of regeneration of the filter bed polyurethane particles in the system of the present invention. First, valve 22 in line 21 is opened and 1 to 5 bed volumes of a regeneration liquid is added to the filter bed containing polyurethane particles at least partially loaded with filtered solids and sorbate loaded adsorbent. The regeneration liquid entering in line 21 may be from a separate source of "clean" liquid or may suitably comprise recirculated solids- and sorbable contaminants-depleted effluent from the filter bed, as collected during the active on-stream filtration and adsorption operation of the system. Alternatively, as previously indicated, the regeneration liquid could be influent liquid from line 12. In the FIG. 1 system as shown, the 1 to 5 bed volumes of regeneration liquid as required in the given application are flowed through line 21 through manifold conduit 18 into the filtration vessel 10, following which valve 22 is closed.

Following addition of regeneration liquid to the polyurethane particles in filtration vessel 10, all of the valves in the treatment system are closed. Next, valve 40 in gas flow conduit 39 is opened and gas is flowed through conduit 39 to sparger 41 located in the plenum space 17 of the filtration vessel 10 and gas is sparged into the regeneration liquid containing the polyurethane particles, in sufficient quantity and rate to agitate the regeneration liquid and polyurethane particles and cause deposited solids and adsorbate-loaded adsorbent to disengage from the polyurethane particles and pass into the regeneration liquid to form solids- and adsorbent-containing regeneration liquid. The sparging gas introduced in conduit 39 may suitably comprise air. Venting value 50 is disposed in vent conduit 51 at the upper end of filtration vessel 10 to release excess pressure within the vessel due to the gas sparging operation. In preferred practice, gas is sparged into the regeneration liquid containing the polyurethane particles at a rate of 0.5 to 5.0 standard cubic feet of gas per minute per square foot of cross-section of the filter bed of polyurethane particles, for a period of 0.5 to 5.0 minutes. In applications involving filtration of water containing low solids, e.g., 200 milligrams per liter, it has been found satisfactory in the regeneration step to maintain the gas sparging rate at 1 to 2 standard cubic feet of gas per minute per square foot of cross-section of the filter bed of polyurethane particles, for a period of 1 to 2 minutes. In some applications, it may be advantageous to augment the agitation achieved by gas sparging with mechanical mixing of the regeneration liquid containing the polyurethane particles into which gas is sparged. This may be carried out by activating the agitator, comprising impeller 36 disposed on shaft 37 connected to drive motor 38, simultaneously with the initiation of gas sparging into the regeneration liquid containing the polyurethane particles. Thereafter, mechanical mixing of the regeneration liquid containing the polyurethane particles may be continued during the entire period of gas sparging or, alternatively, mechanical mixing may be continued beyond the period of gas sparging, as necessary or desirable in the given application.

Following the gas sparging agitation of the regeneration liquid and polyurethane particles for the requisite time, valve 24 in line 23 is opened and the agitated solids-enriched and adsorbent-containing regeneration liquid is drained from the filtration vessel 10 through manifold line 18 and waste effluent conduit 23. In the general practice of the invention, it has been found advantageous to drain the agitated solids-enriched and adsorbent-containing regeneration liquid from the polyurethane particles of the filter bed at a rate of 10-40 gallons per minute per square foot of cross-section of the filter bed of polyurethane particles, and preferably at a rate of 20-30 gallons per minute per square foot of cross-section of the filter bed of polyurethane particles. The agitated solids- and adsorbent-containing regeneration liquid drained from the polyurethane particles is discharged in line 23 to treatment complex 28, wherein the sorbate-loaded adsorbent is separated from the solids-enriched regeneration liquid, with the former being discharged in line 29 and the latter in line 27. As a modification of the process, the solids-containing liquid effluent in line 27 may be recirculated to the filter bed during the normal on-stream operation for renewed removal of suspended solids therefrom. As previously discussed, the solids- and adsorbent-containing effluent regeneration liquid may be bypassed around the treatment complex 28 via bypass conduit 25 having control valve 26 disposed therein, so that the regeneration liquid is discharged, without treatment, from the system in line 27. If the sorbate-loaded adsorbent is separated from the regeneration liquid effluent in complex 28, and discharged into line 29, the same may be treated in regeneration complex 30 to remove sorbate therefrom and recirculated in line 31 to the source means 32 of particulate adsorbent.

Following drainage of the solids- and adsorbent-containing regeneration liquid from the filtration vessel, valves 24 and 40 are closed. In some applications, the filter bed of polyurethane particles will have been cleaned via the aforementioned regeneration steps to such degree that normal on-stream filtration operation may then be resumed, however, in other applications it may be desirable to repeat the aforementioned regeneration steps in sequence as successive regeneration cycles. Normally, no more than 2 to 4 such successive regeneration cycles need be carried out. In applications where multiple regeneration cycles are carried out, it is advantageous to conduct the final regeneration step of draining solids- and adsorbent-containing regeneration liquid from the polyurethane particles to only a partial extent, such that not more than one bed volume of the solids- and adsorbent-containing regeneration liquid remains associated with the polyurethane particles, followed by flushing of the polyurethane particles with one to five bed volumes, and preferably one to two bed volumes, of the solids-containing and sorbable contaminant-containing influent liquid prior to reloading of the polyurethane particles with adsorbent and reinitiation of on-stream filtration operation. To effect such flushing, valve 13 is opened and solids- and sorbable contaminants-containing influent liquid is passed through the bed, with subsequent passage of the flushed liquid into effluent conduit 23 (valve 24 being open). Such flushing operation is preferred in order to remove residual suspended solids from the interstitial (void) spaces between the polyurethane particles in the filter bed, to yield a fully cleaned filter bed for the subsequent normal on-stream filtration step. Following flushing, particulate adsorbent from source 32 is introduced into the filtration vessel and loaded into the pores of the polyurethane particles in the filter bed, as previously described, and thereafter normal on-stream filtration operation is conducted.

For the general practice of the invention wherein the solids- and sorbable contaminants-containing liquid is water, as for example municipal water purification or the treatment of municipal and/or industrial wastewaters, a particularly preferred particulate adsorbent is activated carbon, which may for example be in the form of powder having a grain size smaller than about 325 mesh. Alternatively, in other water treatment applications, the particulate adsorbent may suitably comprise an ion exchange resin.

Figure 2:
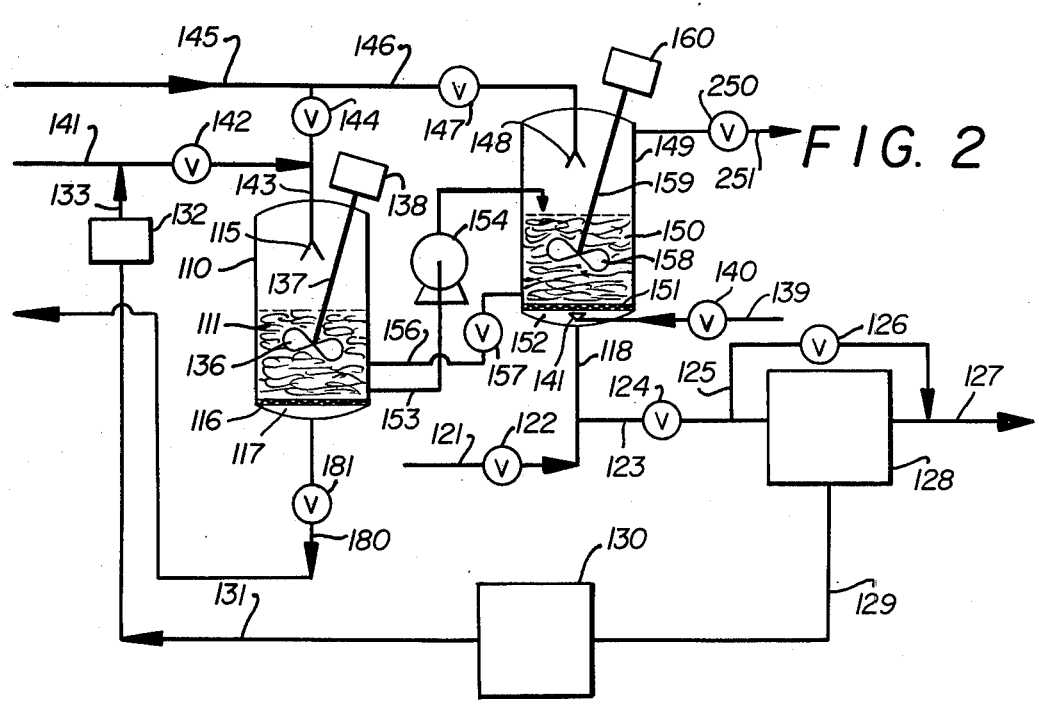
FIG. 2 is a schematic diagram of another liquid treatment system wherein the process of the invention may be conducted, and wherein regeneration of the filter bed polyurethane particles is carried out in a separate regeneration vessel.

As opposed to the FIG. 1 system, wherein the filter bed of polyurethane particles is retained in the filter vessel during regeneration of the filter bed polyurethane particles, FIG. 2 shows a system wherein the filter bed polyurethane particles are removed from the filter vessel and transferred to a regeneration vessel for regeneration thereof prior to reintroduction to the filter vessel for carrying out normal filtration operation.

In the FIG. 2 system, the filter bed of polyurethane particles 111 is disposed in a vertically extending filter vessel 110 of constant horizontal cross-section. Initially all valves in the treatment system are closed, with the exception of valve 142 in feed line 141 and valve 181 in effluent line 180. Particulate adsorbent from source 132 is conducted via conduit 133 into feed line 141 and the resulting liquid-solids mixture is conducted from line 141 through manifold conduit 143 to liquid distributor 115 for introduction to the filter bed of polyurethane particles 111. The particulate adsorbent-liquid mixture may be flowed at high rate through the filter bed to lodge the particulate adsorbent in the pores of the polyurethane particles, with the resultant adsorbent-depleted liquid being discharged from the filter vessel 110 in effluent line 180, as previously described. Alternatively, valve 181 in effluent line 180 may be closed and the particulate adsorbent-liquid mixture may be introduced to the filter vessel 110 and mechanically mixed therein by agitator comprising impeller 136 to cause the particulate adsorbent to pass into and lodge firmly in the pores of the polyurethane particles, with subsequent draining of the adsorbent-depleted liquid through effluent line 180 (valve 181 then being opened). Thus, the particulate adsorbent may be placed in the pores of the polyurethane particles in vessel 110 in the same manner as previously described in connection with FIG. 1. After the particulate adsorbent has been firmly loaded into the pores of the polyurethane particles, valve 142 in line 141 is closed and valve 144 is opened to admit suspended solids- and adsorbable contaminants-containing influent liquid from line 145 through line 143 to liquid distributor 115, for flow of such liquid through the filter bed for deposition of suspended solids on the polyurethane particles and adsorption of the adsorbable contaminants by the particulate adsorbent to yield a solids- and adsorbable contaminants-depleted liquid effluent, which is discharged from the filter bed 110 in line 180. This passage of suspended solids- and adsorbable contaminants-containing influent liquid through the filter bed is continued until the filter bed is at least partially loaded with deposited solids and adsorbed contaminants, following which valves 144 and 181 are closed.

For regeneration of the filter bed polyurethane particles, pump 154 is activated and the polyurethane particles of the filter bed are transferred in line 153 from filtration vessel 110 to regeneration vessel 149. In the regeneration vessel 149, the transferred polyurethane particles are pumped on to support grid 151; following transfer of all of the polyurethane particles from filtration vessel 110 to regeneration vessel 149, pump 154 is deactivated.

Next, valve 122 in conduit 121 is opened and from one to five bed volumes of regeneration liquid free of adsorbable contaminants is introduced from line 121 through manifold conduit 118 to the regeneration vessel, following which valve 122 is closed. Valve 140 is then opened in gas flow conduit 139 and gas, such as air, is flowed through conduit 139 to sparger 141 disposed beneath grid 151 in the regeneration vessel 149. In this manner, gas is sparged into the regeneration liquid containing the polyurethane particles in sufficient quantity and rate to agitate the regeneration liquid and polyurethane particles and cause deposited solids and adsorbate loaded adsorbent to disengage from the polyurethane particles and pass into the regeneration liquid to form solids- and adsorbent-enriched regeneration liquid. Venting valve 250 is disposed in vent conduit 251 at the upper end of regeneration vessel 149 to release excess pressure within the vessel due to the gas sparging operation. The removal of deposited solids and adsorbate loaded adsorbent from the polyurethane particles in regeneration vessel 149 may be assisted by mechanical agitation, i.e., activation of the agitator comprising impeller 158 connected by shaft 159 to motor drive means 160. After gas sparging (and, optionally, mechanical mixing) is continued for the requesite time, e.g., 2-3 minutes, valve 124 in waste effluent line 23 is opened and the agitated solids- and adsorbent-containing regeneration liquid is drained from the polyurethane particles in the regeneration vessel 149. The drained solids- and adsorbent-containing regeneration liquid may be passed in line 123 to treatment complex 128 or, alternatively, such regeneration liquid may be passed via bypass line 125 having control valve 126 therein directly to effluent discharge conduit 127. If processed in treatment complex 128, the sorbate-loaded adsorbent is separated from the solids-enriched regeneration liquid and passed in line 129 to adsorbent regeneration complex 130, wherein the sorbate is removed from the adsorbent, and the resulting regenerated adsorbent is conducted by line 131 to the particulate adsorbent source means 132.

Repetitive regeneration cycles may be performed on the filter bed polyurethane particles in regeneration vessel 149, in a manner similar to that previously described. Following completion of the regeneration steps, valve 157 in conduit 156 is open, whereby the polyurethane particles, now fully regenerated, flow in conduit 156 by gravity for return to the filtration vessel 110. Following transfer of the polyurethane particles back to filtration vessel 110, the filter bed polyurethane particles are again loaded with particulate adsorbent, in the manner previously described, and normal on-stream filtration and adsorption operation are then resumed.

Although preferred embodiments have been described in detail, it will be appreciated that other embodiments are contemplated only with modification of the disclosed features, as being within the scope of the invention.

What is claimed is:

1. In a process for purifying a liquid comprising solids and adsorbable impurities, the liquid being passed through a filter bed comprised of porous polyurethane particles for removing solids therefrom, whereby a solids-depleted liquid effluent is discharged from the filter bed, said passing of said liquid through said filter bed being performed until said filter bed is partially loaded with deposited solids, and removing deposited solids from said filter bed to regenerate same, the improvement comprising:

firmly imbedding a particulate adsorbent selective for adsorbable contaminants contained in the influent liquid, into the pores of said polyurethane particles before passing the liquid comprising solids and adsorbable impurities therethrough, said imbedding of said particulate adsorbent being performed by one of the following methods;

(1) flowing a first liquid containing said particulate adsorbent through said filter bed at a volumetric flow rate at least equal to the highest volumetric flow rate at which an influent second liquid comprising the solids and adsorbable impurities is passed through said filter bed, whereby said particulate adsorbent passes from the liquid containing said particulate adsorbent into the pores of said polyurethane particles and firmly lodges therein, (2) flowing a liquid containing said particulate adsorbent through said filter bed at a volumetric flow rate less than the highest volumetric flow rate at which influent liquid is passed through said filter bed for causing particulate adsorbent to pass from the liquid containing particulate adsorbent into the pores of said polyurethane particles, and subsequently flowing an impurity-free liquid through said filter bed at a volumetric flow rate at least equal to the highest volumetric flow rate at which influent liquid is passed through said filter bed, to firmly lodge particulate adsorbent in the pores of said polyurethane particles, or (3) mixing a liquid containing said particulate adsorbent in said filter bed to cause particulate adsorbent to pass from the liquid into the pores of said polyurethane particles, at least partially draining the liquid from said filter bed such that not more than one bed volume of the liquid remains associated with the polyurethane particles, and flowing an impurity-free fluid through said filter bed at a volumetric flow rate at least equal to the highest volumetric flow rate at which influent liquid is passed through said filter bed, to firmly lodge particulate adsorbent in the pores of said polyurethane particles during filtering, whereby said particulate adsorbent is firmly lodged in the pores of said polyurethane particles during filtering and is not fluidized in the filter bed during said filtering step.

2. A process according to claim 1 wherein said particulate adsorbent is activated carbon.

3. A process according to claim 2 wherein said activated carbon particulate adsorbent is in the form of powder having a grain size smaller than 325 mesh.

4. A process according to claim 1 wherein said particulate adsorbent is an ion exchange resin.

5. A process according to claim 1 wherein said influent liquid is water.

6. A process according to claim 1 wherein said adsorbate-loaded adsorbent in step (e) is replaced with fresh adsorbent for the repetition of step (b).

7. A process according to claim 1 wherein said adsorbate-loaded adsorbent of step (e) is regenerated to remove adsorbate therefrom prior to re-use of the adsorbent in the repetition of step (b).

8. A process according to claim 1 wherein said filter bed of polyurethane particles is disposed in a vertically extending filter vessel of constant horizontal cross-section and said influent liquid is passed through said filter bed from top to bottom thereof to yield said solids- and adsorbable contaminants-depleted liquid effluent.

9. A process according to claim 8 wherein said filter bed of polyurethane particles is retained in said filter vessel during said regeneration of said filter bed polyurethane particles in step (e).

10. A process according to claim 1 wherein said polyurethane particles are formed of discontinuous, reticulated ester or ether linked polyurethane foam having 10 to 100 cells per linear inch.

11. A process according to claim 10 wherein said polyurethane foam has 20 to 60 cells per linear inch.

12. A process according to claim 1 wherein said polyurethane particles are formed of open-celled polyurethane foam having an air porosity of 80–250 standard cubic feet of air per minute per square foot.

13. A process according to claim 12 wherein said polyurethane foam has an air porosity of 100–170 standard cubic feet of air per minute per square foot.

14. A process for removal of suspended solids and adsorbable contaminants from an influent liquid containing same, comprising:

(a) providing a filter bed of porous polyurethane particles;

(b) placing a particulate adsorbent selective for said adsorbable contaminants into the pores of said polyurethane particles;

(c) passing said suspended solids- and adsorbable contaminants-containing influent liquid through said filter bed for deposition of said suspended solids on said polyurethane particles and adsorption of said adsorbable contaminants by said particulate adsorbent to form a solids- and adsorbable contaminants-depleted liquid effluent, and discharging said liquid effluent from said filter bed;

(d) continuing step (c) until said filter bed is at least partially loaded with deposited solids and adsorbed contaminants;

(e) removing deposited solids and adsorbate loaded adsorbent from said at least partially loaded filter bed polyurethane particles to regenerate same by one of the following methods, (1) adding a regeneration liquid to the filter bed polyurethane particles, mechanically mixing the regeneration liquid containing said polyurethane particles for sufficient time to cause deposited solids and adsorbate-loaded adsorbent to disengage from the polyurethane particles and pass into the regeneration liquid, and draining the disengaged solids-and adsorbent-containing regeneration liquid from the polyurethane particles, (2) adding one to five bed volumes of a regeneration liquid to said polyurethane particles, sparging gas into the regeneration liquid containing said polyurethane particles in sufficient quantity and rate to agitate the regeneration liquid and polyurethane particles and cause deposited solids and adsorbate loaded adsorbent to disengage from the polyurethane particles and pass into the regeneration liquid, and draining the agitated solids-and adsorbent-containing regeneration liquid from the polyurethane particles, (3) adding one to five bed volumes of a regeneration liquid to said polyurethane particles at least partially loaded with filter solids, sparging gas into the regeneration liquid containing said polyurethane particles at a rate of 0.5 to 5.0 standard cubic feet of gas per minute per square foot of cross-section of said filter bed of said polyurethane particles, while mechanically agitating the regeneration liquid containing said polyurethane particles, to cause filtered solids to disengage from the polyurethane particles and pass into the regeneration liquid to form solids-enriched regeneration liquid, and terminating the mechanical mixing of said regeneration liquid containing said polyurethane particles and immediately thereafter draining the solids-enriched regeneration liquid from the polyurethane particles; and (f) repeating steps (b) to (e) in sequence, wherein step (b) is carried out by one of the following methods:

(1) flowing a liquid containing said particulate adsorbent through said filter bed at a volumetric flow rate at least equal to the highest volumetric flow rate at which influent liquid is passed through said filter bed in step (c), whereby particulate adsorbent passes from the liquid into the pores of said polyurethane particles and firmly lodges therein;

(2) flowing a liquid containing said particulate adsorbent through said filter bed at a volumetric flow rate less than the highest volumetric flow rate at which influent liquid is passed through said filter bed in step (c) to cause particulate adsorbent to pass from the liquid into the pores of said polyurethane particles, followed by flowing a liquid through said filter bed at a volumetric flow rate at least equal to the highest volumetric flow rate at which influent liquid is passed through said filter bed in step (c), to firmly lodge particulate adsorbent in the pores of said polyurethane particles; or (3) mixing a liquid containing said particulate adsorbent in said filter bed to cause particulate adsorbent to pass from the liquid into the pores of said polyurethane particles, at least partially draining the liquid from said filter bed such that not more than one volume of the liquid remains associated with the polyurethane particles, and flowing an impurity-free liquid through said filter bed at a volumetric flow rate at which influent liquid is passed through said filter bed in step (c), to firmly lodge particulate adsorbent in the pores of said polyurethane particles, whereby said particulate adsorbent is firmly lodged in the pores of said polyurethane particles throughout step (c) and is not fluidized in the filter bed during said step.

15. A process according to claim 14 wherein said regeneration steps are repeated in sequence as successive regeneration cycles.

16. A process according to claim 15 wherein two to four successive regeneration cycles are carried out.

17. A process according to claim 16 wherein in the final regeneration cycle the final regeneration step of draining the disengaged solids- and adsorbent-containing regeneration liquid from the polyurethane particles is conducted so as to only partially drain the agitated solids- and adsorbent-containing regeneration liquid from the polyurethane particles, such that not more than one bed volume of the solids- and adsorbent-containing regeneration liquid remains associated with the polyurethane particles, followed by flushing of the polyurethane particles with one to five bed volumes of said influent liquid prior to reinitiation of step (b).

18. A process according to claim 17 wherein the solids- and adsorbent-containing liquid effluent from the flushing step is separated into solids-containing liquid effluent and adsorbent, and the solids-containing liquid effluent is passed through the filter bed during step (c).

19. A process according to claim 17 wherein the polyurethane particles are flushed with one to two bed volumes of said influent liquid.

20. A process according to claim 14 wherein the disengaged solids- and adsorbent-containing regeneration liquid is drained from the polyurethane particles at a rate of 10 to 40 gallons per minute per square foot of cross-section of the filter bed of polyurethane particles.

21. A process according to claim 14 wherein said sparging gas is air.

22. A process according to claim 14 wherein step (2) is said removing deposited solids step (e) further comprises sparging gas into the regeneration liquid containing said polyurethane particles at a rate of 0.5 to 5.0 standard cubic feet of gas per minute per square foot of cross-section of said filter bed of said polyurethane particles, for a period of 0.5 to 5.0 minutes prior to draining the agitated solids-and adsorbent-containing regeneration liquid from the polyurethane particles.

23. A process according to claim 14 wherein said regeneration steps (1) to (3) are repeated in sequence as successive regeneration cycles.

24. A process according to claim 23 wherein two to four successive regeneration cycles are carried out.

* * * * *